(12) United States Patent
Richardson et al.

(10) Patent No.: US 6,764,109 B2
(45) Date of Patent: Jul. 20, 2004

(54) HAMMER UNION AND SEAL THEREFOR

(76) Inventors: H. Gary Richardson, 3833 County Rd. 1441, Mathis, TX (US) 78368; Paul H. Snowden, P.O. Box 5, Orange Grove, TX (US) 78372

( * ) Notice: Subject to any disclaimer, the term of this patent is extended or adjusted under 35 U.S.C. 154(b) by 0 days.

(21) Appl. No.: 10/209,240

(22) Filed: Jul. 31, 2002

(65) Prior Publication Data

US 2004/0021319 A1 Feb. 5, 2004

(51) Int. Cl.[7] ............................................. F16L 19/00
(52) U.S. Cl. ........................ 285/354; 285/347; 285/379
(58) Field of Search ................................ 285/354, 386, 285/39, 347, 359, 379

(56) References Cited

U.S. PATENT DOCUMENTS

| | | | |
|---|---|---|---|
| 2,726,104 A | 12/1955 | Boitnett | |
| 3,140,107 A | 7/1964 | Hynes | |
| 3,799,584 A | * 3/1974 | Slocum | 285/354 |
| 3,848,905 A | * 11/1974 | Hammer et al. | 285/354 |
| 3,891,251 A | * 6/1975 | Richter | 285/354 |
| 4,524,998 A | * 6/1985 | Brisco | 285/354 |
| 4,538,842 A | * 9/1985 | Kowal et al. | 285/354 |
| 4,930,791 A | 6/1990 | Ungchusri | |
| 5,011,196 A | * 4/1991 | Sabatier et al. | 285/379 |
| H945 H | 8/1991 | Taliaferro | |
| 5,074,599 A | * 12/1991 | Wirbel et al. | 285/354 |
| 5,366,261 A | * 11/1994 | Ohmi et al. | 285/354 |
| 5,382,057 A | * 1/1995 | Richter | 285/354 |
| 6,435,568 B1 | * 8/2002 | Fukano et al. | 285/354 |
| 6,565,124 B2 | * 5/2003 | Mosse | 285/354 |

* cited by examiner

Primary Examiner—David E. Bochna
(74) Attorney, Agent, or Firm—G. Turner Moller

(57) ABSTRACT

A hammer union comprises a thread end, a nut end and a hammer nut which, when cinched up, compresses a composite seal assembly thereby preventing leakage. The seal assembly comprises a metal insert of a size to pass into the seal groove of conventional hammer unions and a small seal acting between the insert, the thread end and the nut end. The small seal is conveniently an O-ring and is of a size that is compressed when the seal assembly is inserted into the thread end of the hammer union, thereby preventing the seal assembly from falling out of the threaded end when it is inverted.

14 Claims, 2 Drawing Sheets

US 6,764,109 B2

HAMMER UNION AND SEAL THEREFOR

This invention relates to an improved technique for sealing between members of a hammer union and more particularly to an improved seal assembly that replaces the existing seal of a hammer union.

BACKGROUND OF THE INVENTION

In the testing and production of hydrocarbon wells, specialized couplings are provided which incorporate seals to prevent leakage between the coupling components. One such coupling is known as a union and comprises a coarse male thread on one of the components which cooperates with coarse female threads on a collar to provide a quick connect/disconnect coupling.

A more specialized quick connect/disconnect coupling is known as a hammer union which comprises four components: a thread end having coarse male threads on the exterior, a seal on the inside of the thread end, a nut end having a smooth nose abutting the seal and a hammer nut having coarse female threads on the interior and ears on the exterior which may be struck with a hammer to cinch up the coupling. Because hammer unions have the capability of being quickly connected and disconnected, they are widely used in temporary installations or in equipment which is expected to be disassembled periodically.

Hammer unions have not been redesigned in many decades. The seal in a conventional hammer union is a large annular rubber seal that is basically rectangular in cross section. One of the coupling components provides a groove or rabbit receiving the annular rubber seal which is compressed between the coupling components when they are cinched up, thereby providing a seal. The rubber component is exposed to gases, fluids and abrasives flowing in the interior flow passage of the coupling. This conventional seal has withstood the test of time and has basically been unchanged for at least fifty years.

One of the situations where hammer unions are widely used is in equipment to test gas wells after they are initially completed or after recompletion from one zone to another. Typically, regulatory agencies require that gas wells be tested to provide a measure of gas deliverability and pressure using chokes of several different size. To enforce these regulations, regulatory agencies often will not allow a well to be produced into a sales line before testing. Test equipment typically comprises a trailer having an inlet end for connection to the well head, a separator for separating gas and liquid, an orifice meter for measuring the gas from the well and an outlet for connection to a flow line leading to a flare.

Many gas wells, particularly those completed at depth, do not produce commercial quantities of natural gas until they are fraced. It is a tribute to the research of major oil companies and major oil field service companies that modern frac techniques convert large numbers of conventionally completed uneconomic wells into economic ones. A typical current frac job injects a liquid or gel containing 500,000 or so pounds of sand or other proppant under pressure into a well to create, propagate and prop open a vertical fracture extending many hundreds of feet away from a well bore to provide a high permeability flow path from a relatively low permeability formation to the well bore.

One of the facts of life of fracturing a well with a large quantity of sand or other proppant is that not all of the proppant stays in the hydrocarbon zone when the well is produced. When production starts, some of the proppant returns to the well bore and is produced at the surface.

Hammer unions are also widely used on drilling rigs to make mud line connections, to make connections in cementing operations and to pump various liquids into a well bore during completion operations.

Disclosures of some interest relative to this invention are U.S. Pat. Nos. 2,726,104; 3,140,107; 3,848,905; 4,930,791 and U.S. Patent Publication H945.

SUMMARY OF THE INVENTION

In this invention, it is recognized that new gas wells, particularly those that have been fraced, produce high velocity streams of proppant laden gas and liquid. Because the proppants are sand or similar particles, they are quite abrasive. These high velocity abrasive well streams have the capability of cutting out the conventional seals used in many flow line connections, specifically hammer unions. This creates a dangerous and awkward situation where highly flammable well production, both liquid and gas, escapes from a flow line at a location where it is unexpected. Instead of the well contents being flared at a flare installation hundreds of feet from the well head or test rig, all of a sudden, well contents are escaping in the test rig, immediately adjacent the well head or some other equally unsuitable location. Well testers and others in the immediate area have to be vigilant to detect the onset of large leaks in flow lines and test equipment and be prepared to shut the well in. It is a scary thing to shut in a well producing a high velocity stream loaded with proppant because of the danger of cutting out valves on the well head, leaving the well uncontrollable.

In this invention, flow line coupling seals, such as in hammer unions, are modified to provide a seal largely protected against the abrasive action of high velocity well contents. Specifically, the conventional all-rubber seal is removed and discarded. It is replaced by an annular metal insert or carrier having a small annular groove or rabbit receiving an O-ring or other much smaller seal. In this fashion, a seal protected against the action of abrasive high velocity well fluids is placed in the same groove as a conventional seal, meaning that the metal components of a conventional flow line coupling, such as a hammer union, do not have to be machined or otherwise modified to accommodate a seal providing a much longer useful life.

It is an object of this invention to provide an improved method and apparatus sealing a flow line coupling.

Another object of this invention is to provide an improved hammer union.

A further object of this invention is to provide a technique for changing the seal of a flow line coupling without machining or otherwise modifying the permanent metal components of the coupling.

These and other objects and advantages of this invention will become more apparent as this description proceeds, reference being made to the accompanying drawings and appended claims.

DETAILED DESCRIPTION

Figure 1:
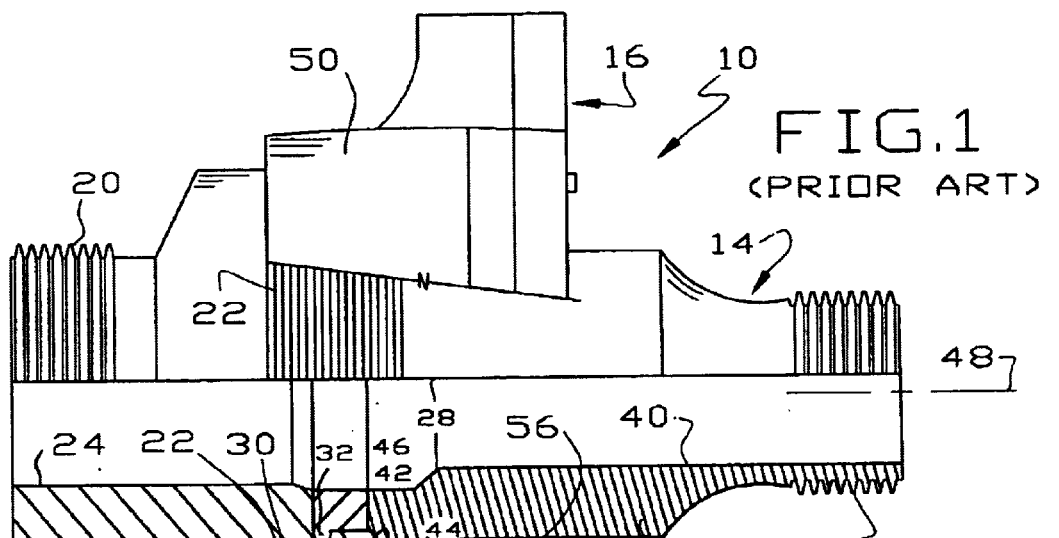
FIG. 1 is a side view of a conventional hammer union having a conventional seal assembly, certain parts being broken away for clarity of illustration.

Referring to FIG. 1, there is illustrated a conventional hammer union 10 comprising as major components a thread end 12, a nut end 14 and a hammer nut 16.

The thread end 12 includes a short conduit 18 adapted to connect to a conduit or pipe, as by providing relatively fine exterior threads 20, such as machine threads or eight round threads. Very coarse exterior threads 22 are provided on the end opposite the threads 20. On the inside, the thread end 12 includes a flow passage 24 and an annular groove or rabbit 26 communicating with the passage 24 for receiving a large rubber seal 28. Typically, the groove or rabbit 26 includes an enlarged rim 30 for receiving a bulge 32 on the rubber seal 28 to assist keeping the seal 28 in the groove 26. The seal 28 is an annular member made of a rubber or rubber like material. The threaded end 12 terminates in a more-or-less frustoconical seat 34 which may be straight or slightly concave.

The nut end 14 includes a short conduit 36 adapted to connect to a pipe or conduit having relatively fine exterior threads 38, such as machine threads or eight round threads. On the inside, the nut end 14 includes a flow passage 40 communicating with the passage 24 providing a passage through the hammer union 10. The nut end 14 terminates in a nose 42 having a more-or-less frustoconical face 44 mating with the seat 34 and providing a seal seat 46 perpendicular to an axis of flow 48 through the hammer union 10.

The hammer nut 16 comprises a collar 50 of sufficient internal diameter to pass over the nut end 14 and the thread end 12 so the internal threads 52 mate with the coarse external threads 22. The hammer nut 16 includes a rim or shoulder 54 which engages a similar exterior shoulder 56 on the nut end 14 thereby closing up the gap between the thread end 12 and the nut end 14 upon threading the collar 50 onto the coarse threads 22. The dimensions of the thread end 12 and the nut end 14 are selected such that cinching up the hammer nut 16 causes the seal seat 46 to compress the seal 28 thereby preventing leakage between the thread end 12 and the nut end 14. The hammer nut 16 also includes a series of ears or projections 58 which may be manually grasped and turned or struck with a hammer to cinch up the thread and nut ends 12, 14. Cooperation between the coarse threads 22, 52 provides a quick connect/disconnect feature for the hammer union 10 and also allows easy connection between the thread and nut ends 12, 14 even when the conduits 18, 36 are not perfectly aligned. Those skilled in the art will recognize the hammer union 10 to be a typical prior art hammer union which has been manufactured and used in the drilling and production of hydrocarbon wells for many decades.

The problem is that the seal 28 is exposed to liquids and gases passing through the flow path provided by the hammer union 10. When the hammer nut 16 cinches up the thread end 12 and the nut end 14, there is a tendency to compress the rubber seal 28 so it bulges out into the flow passage 24. When using a hammer union 10 in a situation where the flow contents are high velocity abrasive laden liquids or gases, there is a tendency for the seal 28 to be eroded or cut out by the abrasives, particularly when it bulges out into the flow passage 24. When the high velocity flow stream is a hydrocarbon liquid or gas, there is a significant hazard because the leaking flow stream is highly flammable and is easily ignited.

Figure 4:
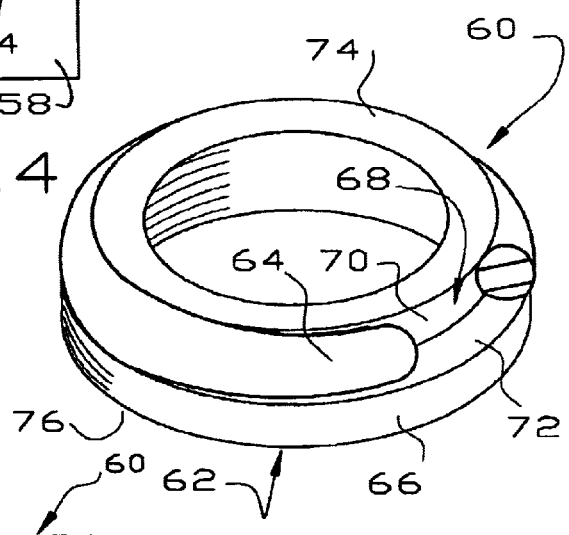
FIG. 4 is an isometric view of the seal assembly of this invention illustrating a metal insert and a resilient O-ring, certain parts being broken away for clarity of illustration.
Figure 3:
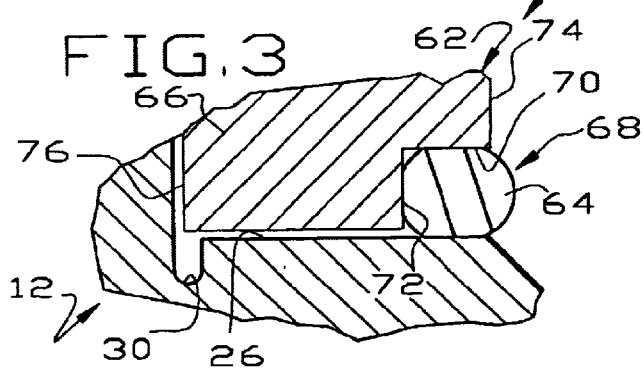
FIG. 3 is an enlarged partial side view showing a seal assembly of this invention in position in a thread end of a hammer union.
Figure 2:
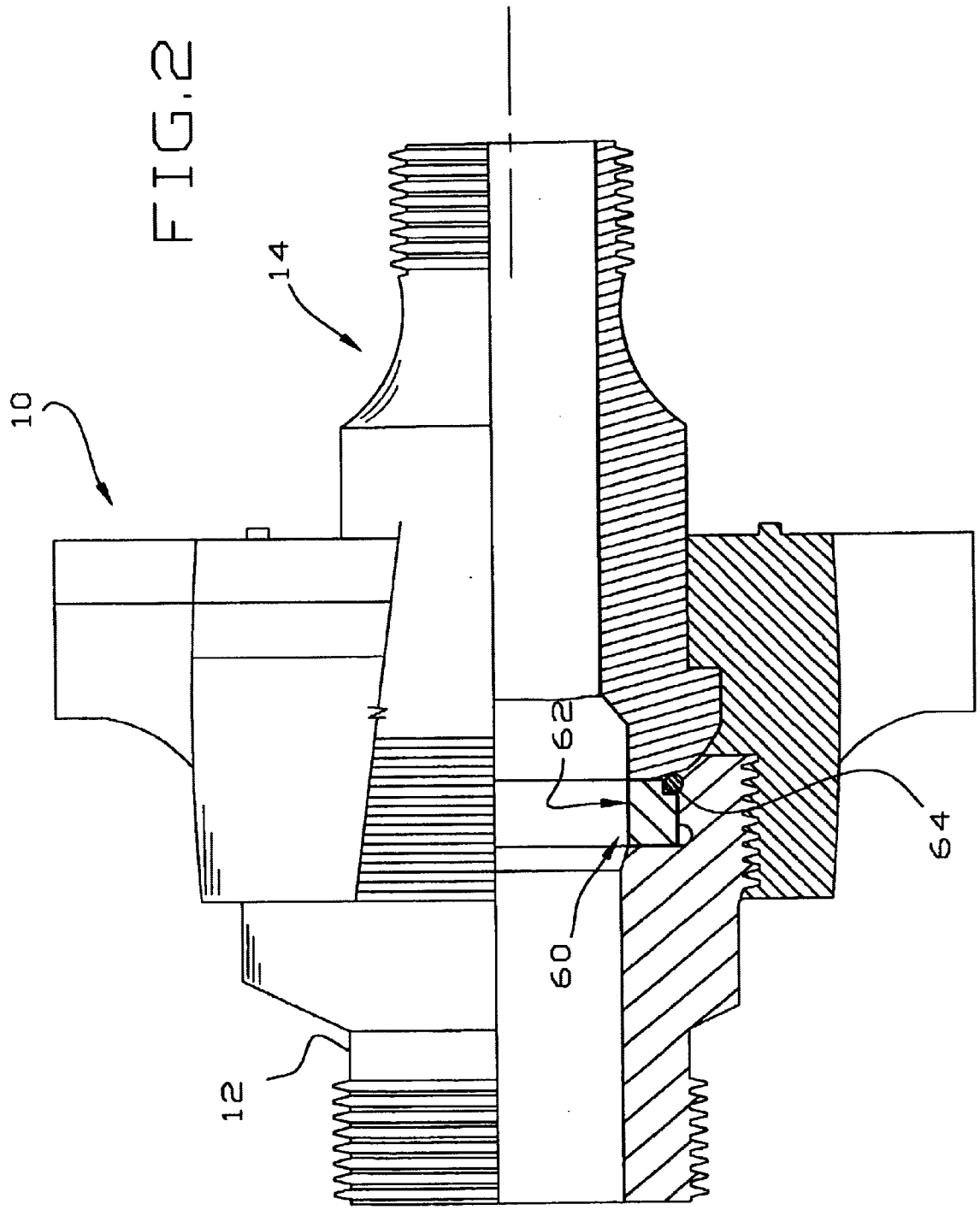
FIG. 2 is a partial broken side view, similar to FIG. 1, of a hammer union incorporating the seal assembly of this invention.

Referring to FIGS. 2–4, this invention is illustrated. In FIG. 2, the standard hammer union 10 has been modified by removing the conventional seal 28, as with a screw driver, awl or other pointed instrument, and replaced with a seal assembly 60 of this invention. The seal assembly 60 comprises an annular metal insert or carrier 62 and a seal 64, typically an O-ring, much smaller than the seal 28. The seal assembly 60 is designed to provide a suitable resilient seal between the thread and nut ends 12, 14 and protect the seal 64 from abrasion due to a high velocity well stream flowing through the passages 24, 40, preferably without modifying the metal components of the hammer union 10. This feature is important because it is much easier to simply replace the seal 28 with the seal assembly 60 than it is to remove an existing hammer union from service, take it to a machine shop and have it machined in some manner, and then return it to service, bearing in mind that the hammer union may be installed in a location many miles from the nearest machine shop.

To these ends, the insert 60 is made of any suitable metal such as one comparable to the thread and nut ends 12, 14. The thickness of the insert 60, i.e. the dimension parallel to the flow axis 48, is approximately the same as, or slightly less than, the compressed conventional rubber seal 28. In this manner, the dimensional design of the conventional hammer union 10 is unaffected because the seat 34 and face 44 engage and stop movement of the thread and nut ends 12, 14. The internal diameter of the metal insert 62 is substantially the same as the diameters of the flow paths 28, 40.

The external diameter of the metal insert 62 is more difficult to select, mainly because there is some variation in the diameter of the groove 26 from manufacturer to manufacturer and in unions of the same manufacturer. It will be recollected that the prior art seal is a large rubber member capable of accommodating grooves of somewhat different diameter. Accordingly, the diameter of the groove 26 has not been tightly controlled in the past, mainly because there was no reason to.

If one were adapting a single hammer union, the external diameter of the insert 62 has to be smaller than the measured diameter of the groove 26. If one were to adapt a large number of hammer unions of the same nominal size, the external diameter of the insert 62 would have to be smaller than all or a very large percentage of existing hammer unions. Thus, one should select an outside diameter of the insert 62 that is considerably smaller than a large fraction of the grooves 26 of existing hammer unions. This means the seal 64 has to be relatively large and/or relatively compressible to accommodate the gaps that occur between the insert 60 and the groove 26.

The requirement that the insert 60 fit a large proportion of existing hammer unions introduces another problem. If the insert 60 is made small enough in diameter to fit most existing hammer unions of the nominal size under consideration, there is the tendency for the seal assembly 60 will fall out of the thread end 12 if it is handled with the threads 20 up. This is not fatal but it is very aggravating for the seal assembly 20 to fall in the mud when the hammer union 10 is being assembled. Accordingly, the seal 64 is selected so its external diameter is noticeably larger than the largest groove 26 so that when the insert 62 and seal 64 are placed in the groove 26, the seal assembly 60 is wedged in place by the seal 64. In other words, the seal 64 wedges the seal assembly 60 in place before the seal 64 is compressed by the seal seat 46 of the nut end 16.

To these ends, the insert 62 comprises an annular metal member 66. The insert 62 might have separate grooves on its side and end but it is much preferred to provide a rabbit or groove 68 on an exterior edge facing the seal seat 46 and the groove 26. The groove 68 accordingly includes an annular face 70 parallel to the flow axis 48 and a annular shoulder or face 72 perpendicular to the flow axis 48. The groove 68 accordingly opens through the outside diameter of the insert 62 to face the thread end 12 and opens through the a rim or shoulder 74 to face the seal seat 46. The groove 68 is typically a small fraction of the cross-sectional size of insert 60. A butt end 76 of the insert 62 abuts the groove 26 and prevents movement of the insert 62 away from the seal seat 46 in a cinched up position of the thread and seal ends 12, 14.

The seal 64 may be of any suitable cross-sectional shape, such as square, polygonal or of compound shape but is preferably round, i.e. an O-ring. The seal 64 is preferably conventional rubber or rubberoid material, which is used herein to mean that the seal has the characteristics of rubber, i.e. it is resilient, tolerant of high temperatures and pressures and relatively chemically inert to compounds typically found in hydrocarbon well streams. A preferred O-ring seal 64 is made of Buna rubber and is available from any automotive supply store or any industrial supply house.

After the old seal 28 has been removed, the metal insert 62 is dropped into the groove 26 and the seal 64 is stretched over the shoulder 76 by inserting part of the O-ring 64 into the groove 68 and progressively pushing or rolling the O-ring 64 around the shoulder 76 and into the groove 68.

The single most common size hammer union is of a nominal 2" internal diameter has a nominal groove diameter of 2$^{11}$/$_{16}$". In fact, upwards of 80% of all existing hammer unions are of 2" nominal diameter. Thus, making a seal assembly which may be used in all 2" hammer unions, without having to machine any of the existing parts is a particularly appealing feature of this invention. Thus, all of the dimensions below relate to 2" hammer unions.

Hammer unions are made by a number of manufacturers, including FMC Corporation of Houston, Tex. The seal groove of a 2" hammer union is stated to be 2$^{11}$/$_{16}$" but measuring a large number of 2" hammer unions showed something slightly different. The largest measured groove diameter was 2.687 inches and the smallest measured groove diameter was 2.660 inches. In order to make a seal assembly that fits all existing hammer unions without machining existing parts, the metal insert 62 of this invention is selected to be small enough to fit in the smallest measured conventional hammer union and accordingly has a maximum size of 2.650 inches, including any tolerances, in diameter. Thus, the maximum size of the metal insert 62 is selected to be 2.650 inches and a tolerance of plus zero, minus 0.005 inches.

The minimum diameter of the metal insert 62 depends on the size, design and compressibility of the seal 64. Because high pressure on the inside of the hammer union 10 produces an axial force and a radial force tending to press the seal 64 into the corner between the hammer nut 16 and the nose 42, it is easy to make the seal 64 perform satisfactorily. Thus, the metal insert 62 may have a loose tolerance on the small side. The minimum diameter of the metal insert is presently unknown because no attempt has been made to make an insert 62 of minimum diameter. However, a preferred minimum diameter is 2.535 inches which is the minimum measured diameter of 2.660 inches less twenty five thousandths of an inch. Although it is believed that much smaller minimum diameters are feasible because the O-ring seals may be made larger than stated below, a practical minimum size is on the order of 2.250 inches.

The thickness of the metal insert 62, i.e. the distance from the rim 74 to the butt end 76 is also capable of substantial variation. The measured distance of a number of nominal 2" diameter hammer unions, with the groove 26 empty but with the hammer nut 16 made up, showed that the groove 26 was more-or-less consistent at about 0.470 inches in length parallel to the flow axis 48. It is preferred that the nut end 14 and the thread end 12 abut, or nearly abut, to provide a closed corner into which the seal 64 is compressed. Thus, the maximum thickness of the metal insert 62 is on the order of 0.470 inches and a preferred metal insert is on the order of about 0.450 inches thick.

In a manner analogous to the selection of the minimum diameter of the metal insert 62, the minimum thickness of the metal insert 62 is subject to wide variation because the seal 64 may be selected to be larger than the preferred dimension stated herein. No attempt has been made to make a satisfactory metal insert with a minimum thickness but a practical minimum thickness is on the order of about 0.30 inches.

The groove 68 cut into the metal insert 62 is sized to receive a suitably sized seal, i.e. a seal that is large enough to seal against the thread end 12 and the nut end 14 in their made up condition. Although the groove 68 may be of any suitable size, in a preferred design for a nominal 2" hammer union, the groove 68 is 0.165 inches on a side, i.e. the sides 70, 72 are 0.165 inches each. The seal 64 is selected to be of a size suitable for an insert 62 of the selected diameter and a groove 69 of the selected size. Although the seal 64 may vary considerably, an O-ring having a nominal diameter of $^{3}$/$_{16}$", which in reality has a diameter of about 0.210 inches, has proved suitable. Thus, an O-ring 64 suitable for this size insert is 2 $^{11}$/$_{16}$ inches in outside diameter. A typical O-ring seal used in this invention is placed in the groove 68 by placing one section of the circumference of the O-ring over the rim 74 and rolling the balance of the O-ring into the groove 68 with the thumbs.

The diameter of the groove face 70 is, analogous to the external diameter of the insert 62, subject to variation because the internal diameter of the seal may vary substantially. For a nominal 2" diameter hammer union with an O-ring seal 64 of $^{3}$/$_{16}$" nominal thickness and 2 $^{11}$/$_{16}$" nominal outside diameter, the diameter of the groove face 70 is conveniently about 2.313 inches with a small tolerance.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

We claim:

1. A hammer union comprising
  a thread end having a conduit section providing a first flow passage, a set of coarse external threads, a first groove for receiving a seal assembly and an outwardly diverging mouth merging with the first groove,
  a nut end having a first terminus providing a nose having a seal seat transverse to the first flow passage and an outwardly diverging body merging with the seal seat and abutting the outwardly diverging mouth, a second terminus and a second flow passage, between the first and second termini, communicating with the first flow passage,
  a seal assembly comprising an annular metal insert received in the first groove and providing a second groove facing the thread end and facing the seal seat, and a resilient seal in the second groove sealably abutting the thread end and abutting the seal seat and substantially isolated by the annular metal insert from the first flow passage, and a hammer nut comprising a collar surrounding the nut end and having coarse internal threads mating with the coarse external threads thereby captivating the thread end to the nut end, drawing the outwardly diverging body into abutting relation with the outwardly diverging mouth and compressing the resilient seal and at least one ear projecting from the exterior of the collar for receiving an impact from a hammer.

2. The hammer union of claim 1 wherein the first groove is annular having a main seal receiving section of generally rectangular cross section.

3. The hammer union of claim 2 wherein the first groove provides a rim of larger diameter than the main seal receiving section.

4. The hammer union of claim 1 wherein the metal insert is loosely received in the first groove and capable of dropping out of the threaded end when the threaded end is inverted and the seal is of a sufficient size to wedge the insert in the first groove if the threaded end is inverted.

5. The hammer union of claim 4 wherein the hammer union is of a nominal 2" diameter having a first groove of a nominal $2^{11}/_{16}$ diameter, the insert having an external diameter of not more than 2.650 inches.

6. The hammer union of claim 5 wherein the second groove is of square cross-section having a first face parallel to the first flow passage and a second face perpendicular to the first flow passage, the first and second faces having a dimension of about 0.165 inches.

7. The hammer union of claim 1 wherein the seal is an O-ring.

8. The hammer union of claim 1 wherein the seal is of polygonal cross-section.

9. The hammer union of claim 1 wherein the seal is made of a material selected from the group consisting essentially of rubber, rubberoid material and mixtures thereof.

10. The hammer union of claim 1 wherein the second groove opens along an edge of the annular metal insert.

11. The hammer union of claim 1 wherein the metal insert provides a butt end, a seal end, and an outer wall of cylindrical shape generally perpendicular to the butt end providing an external diameter, the second groove opening along an edge of the insert through the seal end and through a portion of the outer wall and having a face generally parallel to the outer wall and spaced from the inner diameter, and wherein the resilient seal is an O-ring seal in the second groove extending beyond the external diameter and beyond the seal end.

12. A seal assembly for a conventional hammer union of the type having a thread end, a nut end, a hammer nut connecting the thread end and the nut end, the thread end and the nut end providing an axial flow passage therethrough and a seal cavity therebetween having a length in the direction of the flow passage, the length being variable between hammer unions, the seal cavity being bounded at one end by a non-adjustable rigid shoulder provided by the thread end and a seal seat on the nut end, comprising an annular metal insert providing a butt end for abutting the non-adjustable shoulder, a seal end for abutting the seal seat of the nut end, an internal diameter providing a flow passage and an outer wall of cylindrical shape generally perpendicular to the butt end providing an external diameter and having a groove opening along an edge of the insert through the seal end and through a portion of the outer wall and having a face generally parallel to the outer wall and spaced from the inner diameter, the insert being sized and shaped to fit into the seal cavity and having an axial length parallel to the length of the seal cavity, the axial length of the insert being substantially less than the external diameter so the insert fits into the seal cavity; and a resilient seal in the groove extending beyond the external diameter and beyond the seal end, the metal insert substantially isolating the seal from abrasive contact with materials flowing in the flow path.

13. The seal assembly of claim 12 wherein the seal is an O-ring, the O-ring being smaller, in an unstressed condition of the O-ring, than the groove internal diameter so the O-ring may be rolled into the groove thereby tensioning the O-ring.

14. The seal assembly of claim 12 wherein the seal assembly is for a nominal 2" diameter hammer union and the annular metal insert has an outer diameter of not greater than 2.650 inches and not less than 2.250 inches so the metal insert will fit in an existing seal groove of nominal 2" diameter hammer unions without machining the hammer union.

* * * * *